United States Patent
Kim et al.

(10) Patent No.: US 9,986,528 B2
(45) Date of Patent: May 29, 2018

(54) METHOD AND DEVICE FOR MEASURING POSITION USING HETEROGENEOUS NETWORK SIGNAL IN WIRELESS ACCESS SYSTEM

(71) Applicant: LG ELECTRONICS INC., Seoul (KR)

(72) Inventors: Bonghoe Kim, Seoul (KR); Kijun Kim, Seoul (KR); Jonghyun Park, Seoul (KR); Hanjun Park, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/503,683

(22) PCT Filed: Aug. 13, 2015

(86) PCT No.: PCT/KR2015/008499
§ 371 (c)(1),
(2) Date: Feb. 13, 2017

(87) PCT Pub. No.: WO2016/024831
PCT Pub. Date: Feb. 18, 2016

(65) Prior Publication Data
US 2017/0280415 A1    Sep. 28, 2017

Related U.S. Application Data

(60) Provisional application No. 62/037,139, filed on Aug. 14, 2014.

(51) Int. Cl.
*H04W 64/00* (2009.01)
*H04L 5/00* (2006.01)
(Continued)

(52) U.S. Cl.
CPC ......... *H04W 64/003* (2013.01); *G01S 5/0236* (2013.01); *G01S 5/10* (2013.01);
(Continued)

(58) Field of Classification Search
CPC ... H04W 64/003; H04W 24/10; H04W 88/08; H04W 88/02; H04L 5/0048; G01S 5/10; G01S 5/0236
See application file for complete search history.

(56) References Cited

U.S. PATENT DOCUMENTS 9,332,463 B2 *   5/2016   Hirano .............. H04W 36/0061
2009/0247084 A1 *  10/2009   Palanki ................ H04L 5/0007
455/63.1
(Continued)

OTHER PUBLICATIONS

PCT International Application No. PCT/KR2015/008499, Written Opinion of the International Searching Authority dated Dec. 21, 2015, 21 pages.

*Primary Examiner* — Brandon J Miller
(74) *Attorney, Agent, or Firm* — Lee, Hong, Degerman, Kang & Waimey

(57) ABSTRACT

The present invention relates to a method of measuring the position of a terminal by using a heterogeneous network signal. The method comprises receiving transmission time information that represents a time at which a signal for measuring the position of a terminal is transmitted; receiving a first signal from a reference cell at a time represented by the transmission time information; receiving a second signal from a measurement cell at a time represented by the transmission time information; calculating the difference between the time at which the first signal is received and the time at which the second signal is received to generate measurement information; and reporting the measurement information.

12 Claims, 13 Drawing Sheets

(51) Int. Cl.
  *G01S 5/10*    (2006.01)
  *G01S 5/02*    (2010.01)
  *H04W 24/10*   (2009.01)
  *H04W 88/08*   (2009.01)
  *H04W 88/02*   (2009.01)

(52) U.S. Cl.
  CPC .......... *H04L 5/0048* (2013.01); *H04W 24/10* (2013.01); *H04W 88/02* (2013.01); *H04W 88/08* (2013.01)

(56) References Cited

U.S. PATENT DOCUMENTS

| | | | |
|---|---|---|---|
| 2010/0279707 A1* | 11/2010 | Fischer | G01S 5/021 455/456.1 |
| 2012/0122478 A1 | 5/2012 | Siomina et al. | |
| 2012/0142373 A1* | 6/2012 | Kazmi | H04W 64/00 455/456.1 |
| 2012/0314604 A1 | 12/2012 | Siomina et al. | |
| 2013/0017841 A1 | 1/2013 | Kazmi et al. | |
| 2013/0115975 A1 | 5/2013 | Hashimoto et al. | |
| 2013/0150092 A1 | 6/2013 | Frank et al. | |
| 2015/0092738 A1* | 4/2015 | Chakraborty | H04L 5/0005 370/330 |
| 2016/0080958 A1* | 3/2016 | Rinne | H04W 24/10 370/338 |

\* cited by examiner

FIG. 8
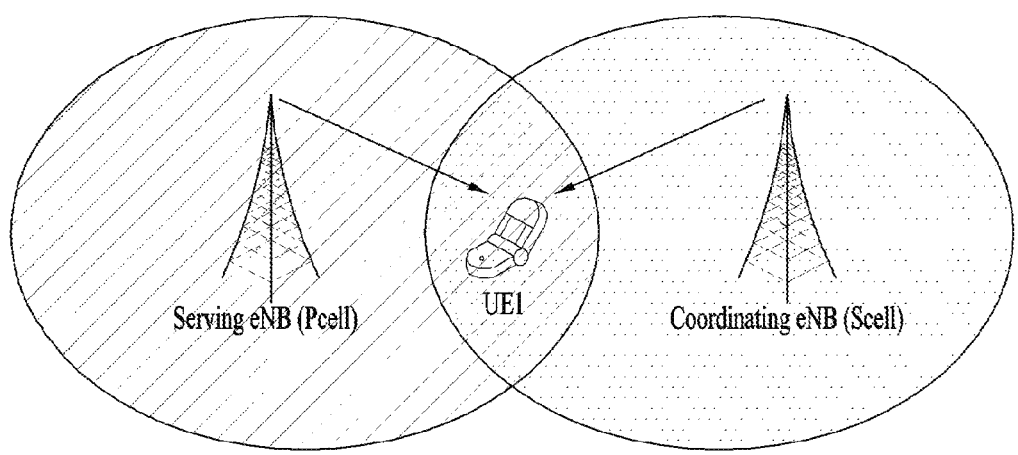
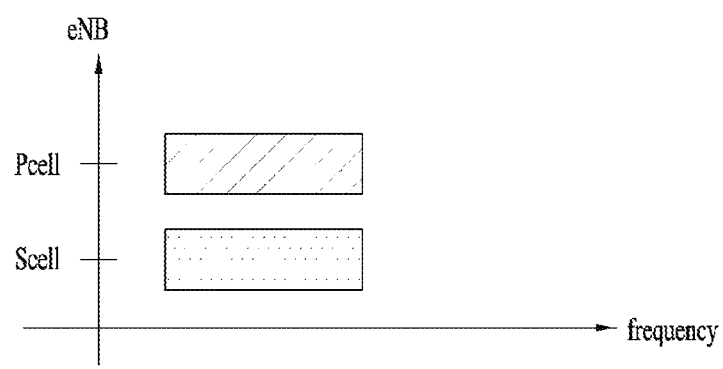

METHOD AND DEVICE FOR MEASURING POSITION USING HETEROGENEOUS NETWORK SIGNAL IN WIRELESS ACCESS SYSTEM

CROSS-REFERENCE TO RELATED APPLICATIONS

This application is the National Stage filing under 35 U.S.C. 371 of International Application No. PCT/KR2015/008499, filed on Aug. 13, 2015, which claims the benefit of U.S. Provisional Application No. 62/037,139, filed on Aug. 14, 2014, the contents of which are all hereby incorporated by reference herein in their entirety.

TECHNICAL FIELD

The present invention relates to a wireless access system, and more particularly, to a method for measuring a position of a user equipment and device for supporting the same. In addition, the present invention is directed to a method and device for using a heterogeneous network signal to measure a position of a user equipment.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Several position measurement methods have already been used and as examples of the position measurement methods, included are an A-GNSS (Assisted Global Navigation Satellite System) scheme, an E-CID (Enhanced Cell-ID) scheme, an UTDOA (Uplink Time Difference Of Arrival) scheme, etc. Such a method for measuring a position of a user equipment has been used to provide a user with various location-based services (e.g., advertisement, position tracking, emergency communication means, and the like).

However, although the conventional position measurement methods can be commonly applied to outdoor/indoor environments, typical position measurement accuracy is significantly low.

For instance, in the case of the E-CID scheme, its position measurement accuracy is estimated as 50 m in a LOS (Line Of Sight) environment and 150 m in an NLOS (Non-LOS) environment. In addition, an OTDOA scheme, which is based on a PRS, has a limitation in that positing measurement error may exceed 100 m due to eNB synchronization error, multipath propagation error, UE's RSTD measurement quantization error, timing offset estimation error, etc. Moreover, in the case of the A-GNSS scheme, since a GNSS receiver is required, it also has a limitation in that implementation complexity and battery consumption is increased. Thus, the A-GNSS scheme is difficult to be applied to indoor position measurement.

In other words, such position measurement schemes have already been supported by 3GPP UTRA and E-UTRA standards (e.g., LTE Rel-9). However, considering the fact that buildings are recently getting larger and higher, position measurement methods need to be improved to enhance accuracy in in-building positioning.

DISCLOSURE OF THE INVENTION

Technical Task

An object of the present invention is to provide a method capable of accurately measuring a position of a user equipment.

Another object of the present invention is to provide a method for measuring a position of a user equipment using a signal transmitted from a heterogeneous network.

A further object of the present invention is to provide a method for measuring a position of a user equipment not only in a horizontal plane but also in a vertical plane, i.e., a method capable of measuring a position of a user equipment in three dimensions.

Still a further object of the present invention is to provide devices for supporting the above-described methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention is directed to a method for measuring a position of a user equipment and device for supporting the same.

In an aspect of the present invention, provided herein is a method for measuring a position of a User Equipment (UE) using a heterogeneous network signal in a wireless access system, the method performed by the UE and including: receiving transmission time information indicating times at which signals for measuring the position of the UE are transmitted; receiving a first signal from a reference cell at a time indicated by the transmission time information; receiving a second signal from a measurement cell at a time indicated by the transmission time information; generating measurement information by calculating a difference value between the time at which the first signal is received and the time at which the second signal is received; and reporting the measurement information, wherein at least one of the reference cell and the measurement cell may be an Access Point (AP) that supports a heterogeneous network, wherein a signal used in the heterogeneous network may be a beacon preamble included in a beacon frame, and wherein a signal used in the wireless access system may be a Positioning Reference Signal (PRS) transmitted from a cellular evolved Node B (eNB).

In another aspect of the present invention, provided herein is a user equipment (UE) for generating measurement information using a heterogeneous network signal in a wireless access system, including: a receiver; a transmitter; and a processor operatively coupled to the receiver and the transmitter and configured to generate the measurement information.

In this case, the processor may be configured to: receive transmission time information indicating times at which signals for measuring a position of the UE are transmitted by controlling the receiver; receive a first signal from a reference cell at a time indicated by the transmission time information by controlling the receiver; receive a second signal from a measurement cell at a time indicated by the transmission time information by controlling the receiver; generate the measurement information by calculating a difference value between the time at which the first signal is received and the time at which the second signal is received; and report the measurement information by controlling the transmitter, wherein at least one of the reference cell and the measurement cell may be an Access Point (AP) that supports a heterogeneous network, wherein a signal used in the heterogeneous network may be a beacon preamble included in a beacon frame, and wherein a signal used in the wireless access system may be a Positioning Reference Signal (PRS) transmitted from a cellular evolved node B (eNB).

In this case, the transmission time information may be transmitted by being included in assistance data, which contains AP information on the AP.

The first signal may be a heterogeneous network signal transmitted from a first AP corresponding to the reference cell and the second signal may be a heterogeneous network signal transmitted from a second AP corresponding to the measurement cell. In this case, each of the first and second signals may be configured with the beacon preamble included in the beacon frame.

The AP information on the AP may be reported together with the measurement information and the AP information may include an identifier indicating the AP and geographical position information of the AP.

The transmission time information may be transmitted from a positioning server and the measurement information and the AP information may be forwarded to the positioning server and used to measure the position of the UE.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

First, a position of a user equipment can be accurately measured.

Second, since a position of a user equipment is measured using a signal transmitted from a heterogeneous network, the user equipment's position can be measured more accurately compared to a case of using a position measurement method supported by a single network.

Third, since a position of a user equipment is measured not only in a horizontal plane but also in a vertical plane according to an environment where a heterogeneous network is deployed, the user equipment's position can be measured in three dimensions in buildings such as a large shopping mall, a skyscraper, etc.

It will be apparent to those skilled in the art that various modifications and variations can be made in the present disclosure without departing from the technical features or scope of the disclosures. Thus, it is intended that the present disclosure covers the modifications and variations of this disclosure provided they come within the scope of the appended claims and their equivalents.

DESCRIPTION OF DRAWINGS

The accompanying drawings, which are included to provide a further understanding of the disclosure, illustrate embodiments of the disclosure and together with the description serve to explain the principle of the disclosure.

In the drawings:

FIG. 8 is a conceptual view of a Coordinated Multi-Point (CoMP) system operating in a CA environment;

BEST MODE FOR INVENTION

Figure 1:
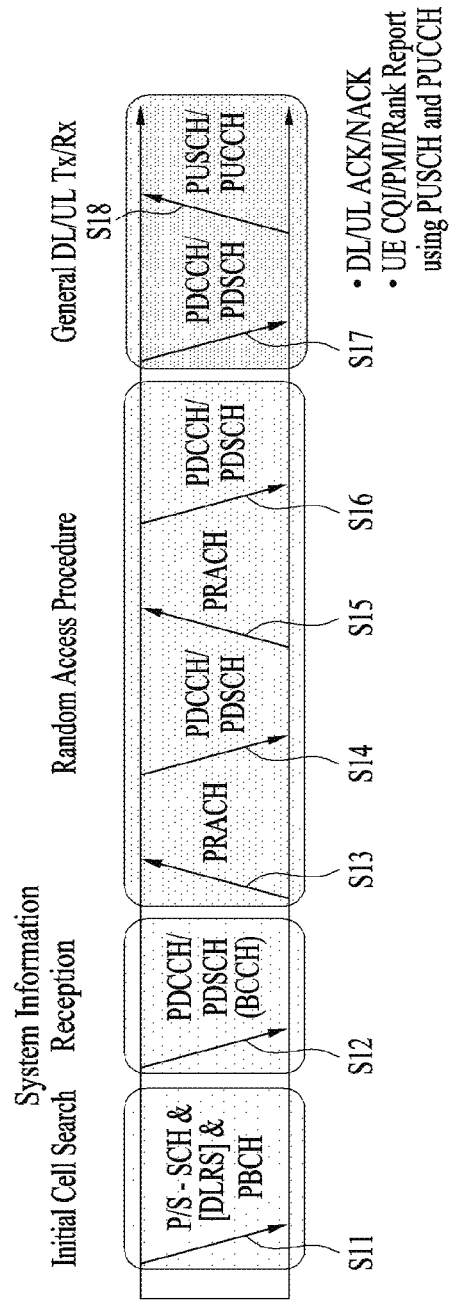
FIG. 1 is a view illustrating physical channels and a signal transmission method using the physical channels.

In the embodiments of the present invention, which will be described in detail below, a method and device for using a heterogeneous network signal to measure a position of a user equipment are provided.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
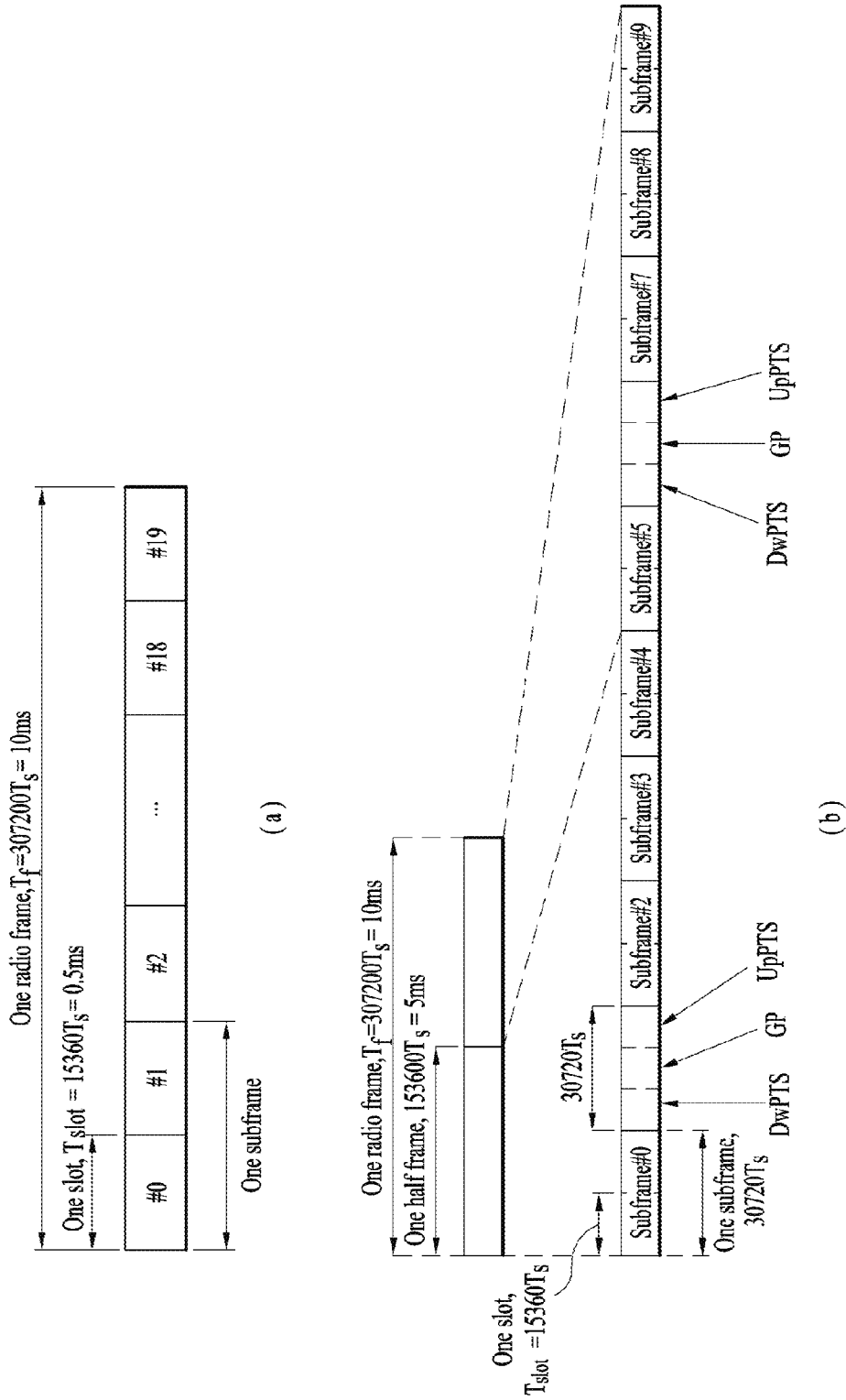
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | $12800 \cdot T_S$ | | |
| 8 | $24144 \cdot T_S$ | | | — | — | — |
| 9 | $13168 \cdot T_S$ | | | — | — | — |

Figure 3:
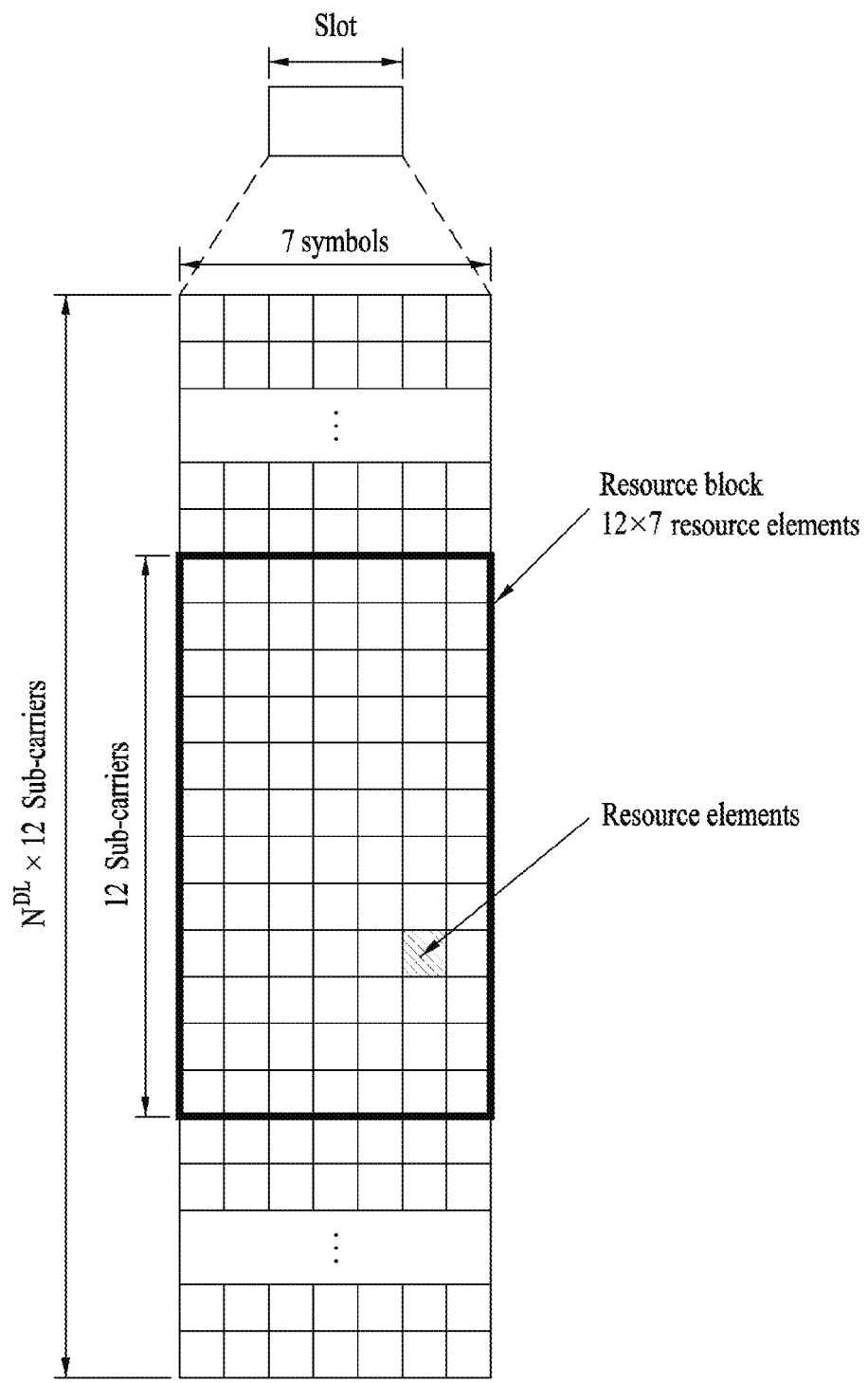
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
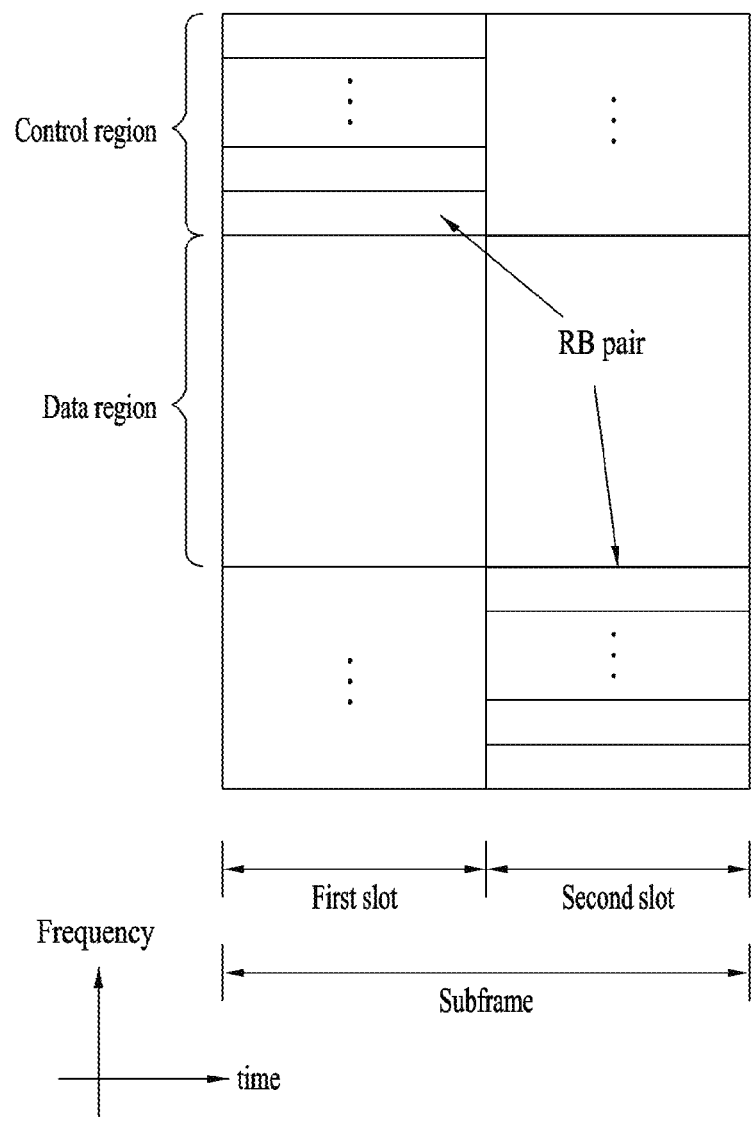
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
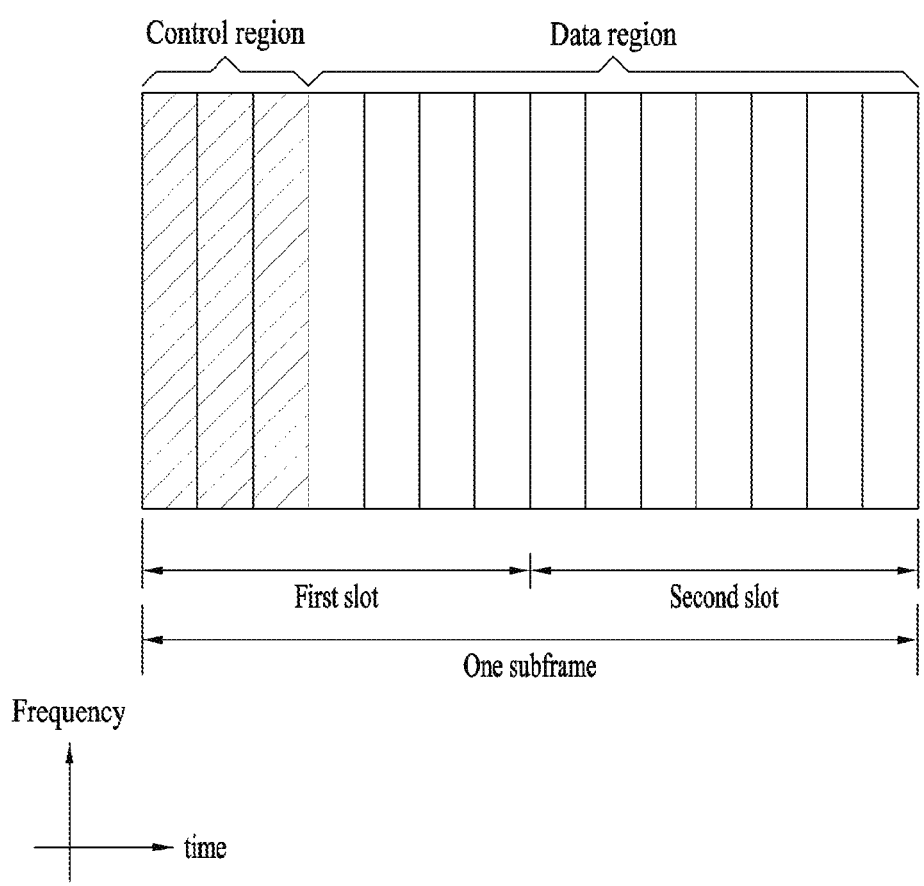
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

Herein, $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_s$ the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | Number of PDCCH |
| --- | --- | --- | --- |
| Type | Aggregation level L | Size [In CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

Herein, $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
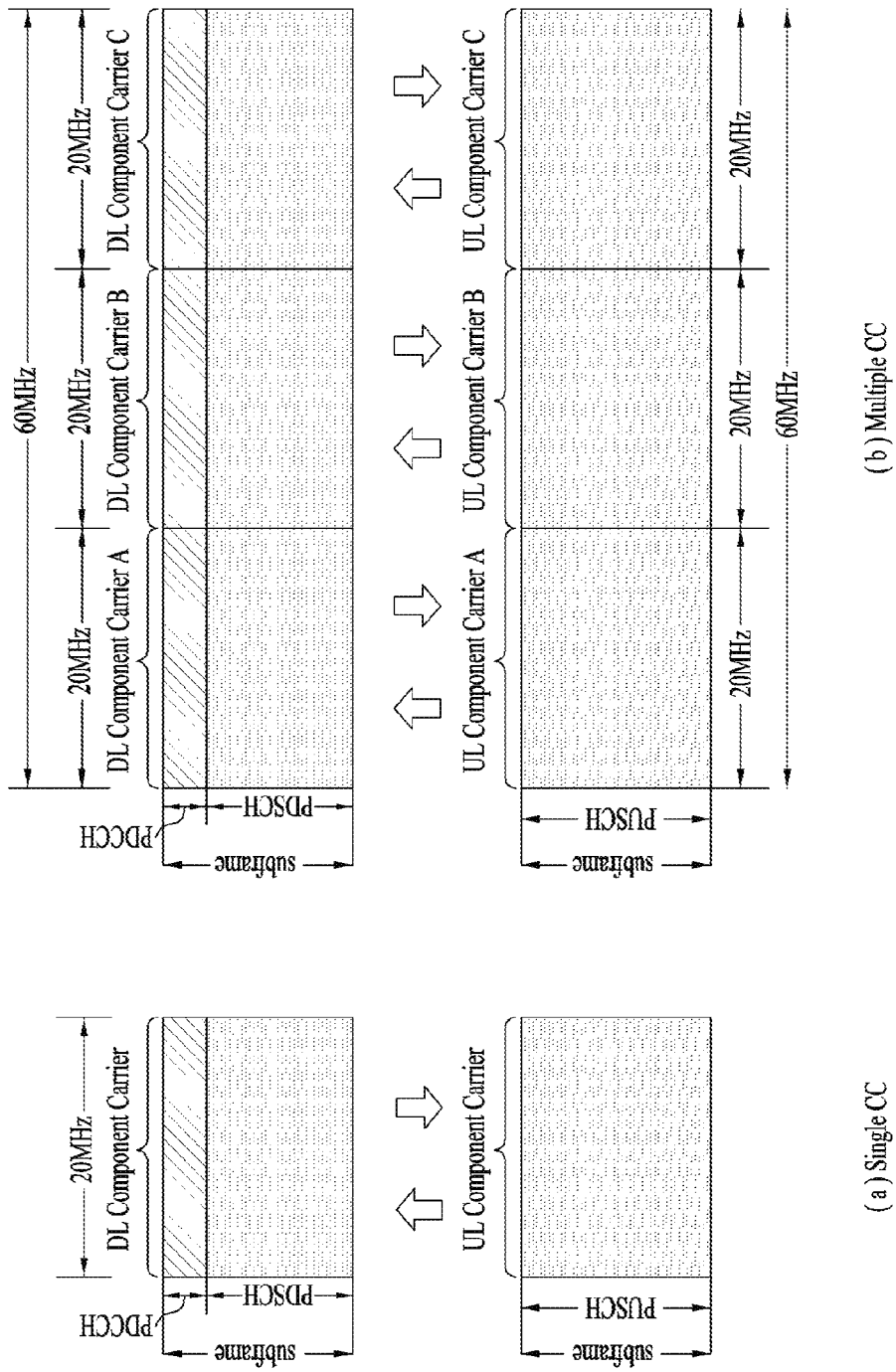
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
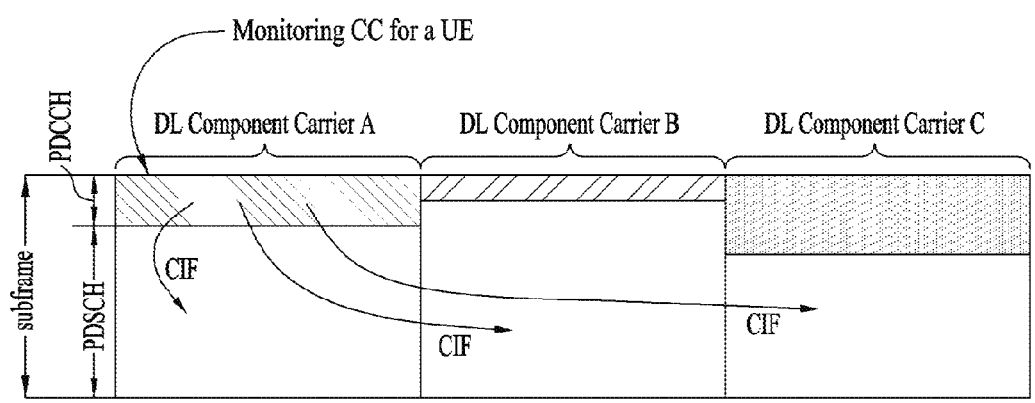
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

2.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 8 is a conceptual view illustrating a CoMP system operating based on a CA environment.

In FIG. 8, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 8 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

3. Distance Measurement Method 3.1 OTDOA

The OTDOA (Observed Time Difference Of Arrival) is one of the position measurement method introduced in the E-UTRA system. As a multilateral measurement scheme, the OTDOA scheme means a scheme in which a UE measures time differences between specific reference signals received from a plurality of eNBs and then reports the measured time differences to a serving eNB or a positioning server (e.g., ESMLC (Serving Mobile Location Center)).

For instance, a UE may calculate and transmit differences between TOA (Time Of Arrival) obtained from a reference eNB and TOAs obtained from a plurality of neighbor eNBs. In this case, the UE may obtain TOAs from at least three neighbor eNBs, which are geographically distributed, to properly estimate its coordinates.

That is, the UE may measure and report TOA differences between the reference eNB and the neighbor eNBs. The reference eNB or the positioning server may calculate a position of the UE based on the time differences received from the corresponding UE.

More details of the OTDOA scheme could be found in the sections 8.1.2.5 and 8.1.2.6 of 3GPP TS 36.133 and the section 6.5.1 of 3GPP TS 36.355. That is, particular operations related to the OTDOA scheme, which are not mentioned in the embodiments of the present invention, could also be performed based on the contents in the standards.

3.2 RSTD (Reference Signal Time Difference Measurement)

Measurement for OTDOA positioning corresponds to an RSTD scheme. Details of the RSTD scheme could be found in the section 5.1.1.2 of 3GPP TS 36.214 and the section 6.5.1.5 of 3GPP TS 36.355. The RSTD can be defined as a relative time difference between two different cells and in this case, it can be determined as the smallest time difference between boundaries of two subframe received from the two different cells. In addition, the two different cells include a reference cell and a measuring cell. Here, the reference cell and the measuring cell may be interpreted as the reference eNB and the neighbor eNB mentioned in the section 3.1, respectively.

3.3 PRS (Positioning Reference Signal)

The RSTD measurement may be performed based on any DL signals (e.g., CRSs (Cell Reference Signals) or synchronization signals). However, these DL signals have poor hearability, which may cause a crucial problem to the OTDAO positioning when a UE receives signals from multiple neighbor cells.

For instance, an SINR (Signal to Interference and Noise Ratio) should be at least −6 dB to receive synchronization signals and reference signals from neighbor cells. However, this may not be enough if the number of geographically dispersed eNBs is not sufficient.

Therefore, a positioning reference signal has been introduced in the 3GPP LTE system to improve OTDOA positioning performance and allow a UE to properly measure time differences from eNBs. Such a PRS has similarity to a CRS in some aspects. As a pseudo-random QPSK sequence, the PRS is assigned in diagonal patterns with shifts on frequency and time axes to avoid collision with a PDCCH and the CRS.

Figure 9:
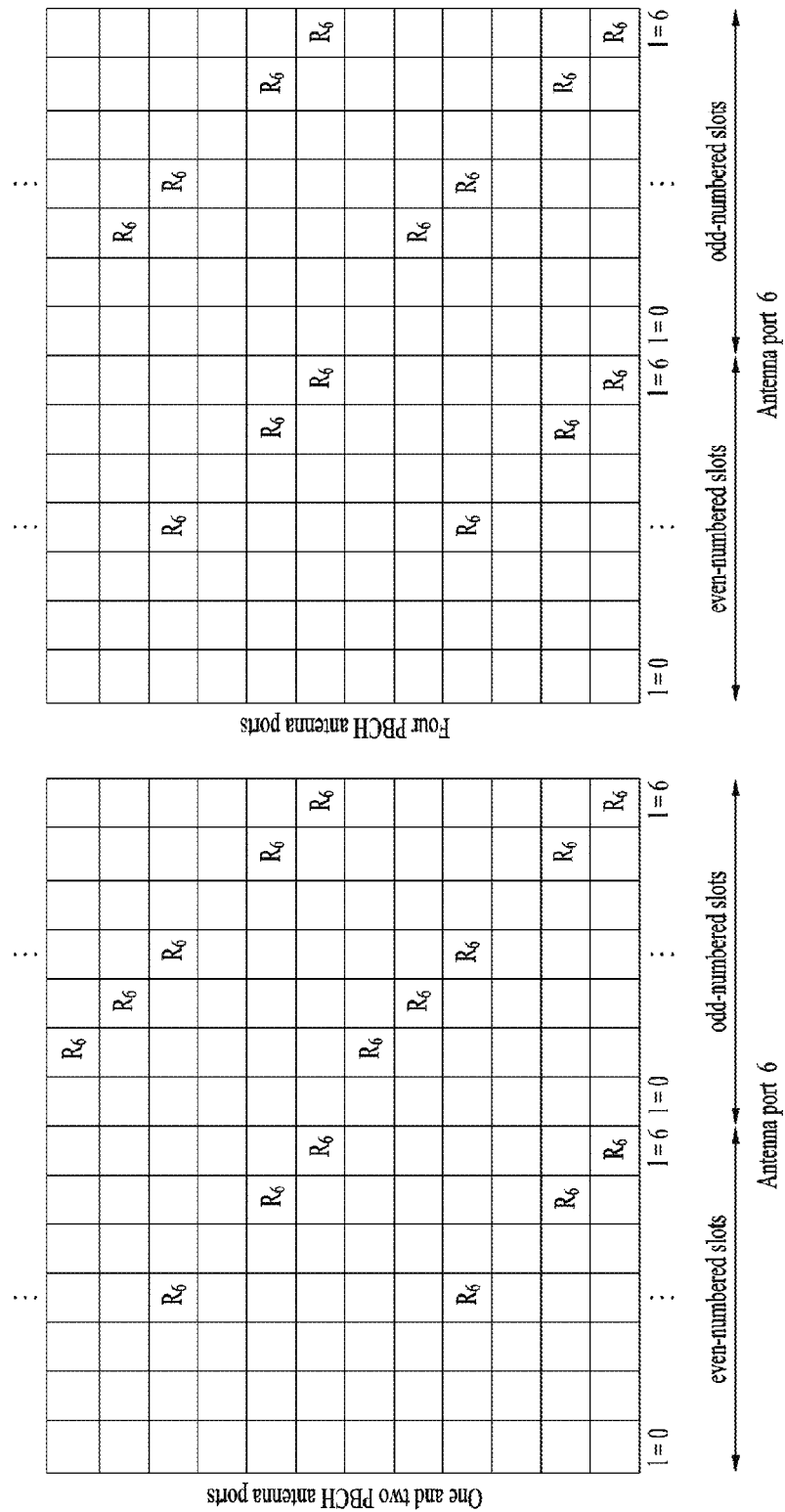
FIG. 9 is a view illustrating an exemplary PRS mapping pattern when a normal cyclic prefix is applied.

FIG. 9 is a view illustrating an exemplary PRS mapping pattern when a normal cyclic prefix is applied. Referring to FIG. 9, the PRS is transmitted through antenna port 6. The PRS is not mapped to resource elements where a PBCH (Physical Broadcast Channel) and synchronization signals are allocated. In addition, the PRS can be defined only when a subcarrier spacing, $\Delta f$ is equal to 15 kHz.

More details of the RPS could be found in the section 6.10.4 of 3GPP TS 36.211. In other words, the contents in the section 6.10.4 of 3GPP TS 36.211 can be applied for particular operation associated with the PRS, which is not mentioned in the embodiments of the present invention.

4. Position Measurement Method Using Heterogeneous Signal

The aforementioned position measurement methods (i.e., positioning schemes) can be utilized in the LTE/LTE-A system corresponding to the cellular system. In addition, the methods can also be applied and utilized for the embodiments of the present invention, which will be described in the following.

In this specification, the term "base station" may be used as a comprehensive term referring to a Remote Radio Head (RRH), an eNB, a Transmission Point (TP), a Reception Point (RP), a relay, etc. For convenience of description, the embodiments of the present invention are hereinafter described based on the 3GPP LTE/LTE-A system (see the sections 1 and 3). However, the corresponding embodiments can be extensively applied to other systems (e.g., UTRA, etc.) as well as the 3GPP LTE system.

In general, various methods have been used in the cellular communication system to allow a network to obtain position information of a user equipment. For instance, the OTDOA scheme based on the PRS is used in the LTE system. To this end, an eNB may configure configuration information associated with PRS transmission for a UE and transmit the information to the UE through a higher layer signal. The UE may receive and measure PRSs transmitted from neighbor cells based on the configuration information. Thereafter, the UE may calculate information on its position based on a position measurement scheme such as the OTDOA and then transmit the calculated information to the network, whereby the network can obtain the position information of the UE (cf. the section 3).

As mobile terminals supporting multiple radio access techniques (multi-RAT (Radio Access Technique)) are widely provided, the Wi-Fi network are rapidly deployed in an indoor environment. Accordingly, a Wi-Fi signal can be efficiently used as a heterogeneous signal to improve UE's position measurement accuracy in the indoor environment.

In the embodiments of the present invention, it is assumed that a UE supports the multi-RAT similar to a smart-phone. For instance, the UE can support both the LTE/LTE-A system corresponding to the cellular network and the Wi-Fi system. In particular, methods for improving UE's position measurement accuracy by reporting measurement results to a cellular network using Wi-Fi signals will be described.

Figure 10:
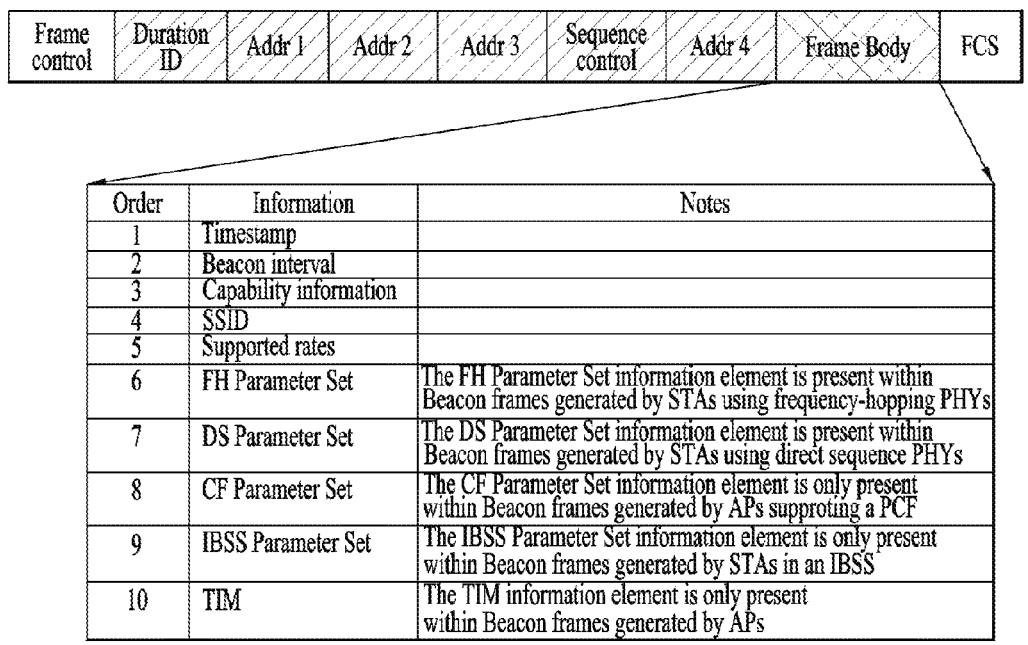
FIG. 10 is a view for explaining a structure of a beacon frame used in a Wi-Fi system.

In the Wi-Fi network, UEs are synchronized with an AP using periodically transmitted beacon signals. FIG. 10 is a view for explaining a structure of a beacon frame used in a Wi-Fi system.

Referring to FIG. 10, a timestamp parameter is included in a frame body filed transmitted through a beacon frame. The timestamp has an 8-byte size and a time required for beacon frame transmission is expressed as unit of 1 us.

4.1 Position Measurement Method Using Heterogeneous Signal Only

Assuming that transmitting and receiving ends uses the same timer, the receiving end can estimate an approximate distance therebetween from a difference between a reception time and a transmission time after receiving a beacon frame. However, in this case, distance estimation error may occur due to a difference between timer clocks of the transmitting and receiving ends.

To complement the distance estimation error, it is possible to apply a two-way scheme in which the transmitting and receiving ends exchange packets with each other. For instance, if beacon transmission times at nodes A and B are respectively defined as tsA and tsB and beacon reception times at the two nodes A and B are respectively defined as trA and trB with reference to the transmitting and receiving ends, it can be defined that to =trA-tsA and tB=tsB-trB from the perspective of the transmitting and receiving ends. Thus, a transmission time is defined as t=(tA-tB)/2.

In addition, assuming that tsA and trB measured in the node A are transmitted to the node B, a node A's clock offset value to with respect to the node B can be estimated as to =[(trA-tsA)-(trB-tsB)]/2. If this value is applied to the node B, the node B may restore a clock drift.

As another aspect, a reference time for beacon frame transmission can be set to a start point of a beacon frame containing a Physical Layer Convergence Protocol (PLCP) preamble. In addition, a reference time for beacon frame reception can be set to a time at which the start point of the beacon frame containing the PLCP preamble is received.

As a further aspect, a method of estimating a propagation delay using a Wi-Fi signal can be applied instead of a method of using a timestamp parameter of a beacon frame. For instance, the receiving end may estimate a propagation delay using the PLCP preamble in the beacon frame. In this case, a transmitted signal (i.e., beacon frame) transmitted from the transmitting end can be expressed as shown in Equation 3.

Equation 3

$$s(t) = \sum_m a_m g(t - mT) \quad \text{[Equation 3]}$$

In Equation 3, $a_m$ indicates a bit sequence of a beacon preamble transmitted from the transmitting end and g( ) corresponds to a pulse shaping filter. In addition, T indicates a symbol period.

Equation 4 below shows a beacon frame received by the receiving end.

Equation 4

$$y(kT_s) = \sum_m a_m g(kT_s - mT - \varepsilon T)e^{j(\theta + \Omega k T_s)} + n(kT_s) \quad \text{[Equation 4]}$$

In Equation 4, $a_m$ indicates a beacon preamble received by the receiving end, $T_s$ indicates a sampling interval used by the receiving end in sampling, T indicates a symbol period, e^j( ) indicates phase error, and n( ) indicates AWGN (Additive White Gaussian Noise), which occurs in the course of sampling.

The propagation delay of the received beacon frame can be given as shown in Equation 5.

Equation 5

$$\varepsilon = -\frac{1}{2\pi}\arg\left(\sum_{l=0}^{LN-1} |y_l|^2 e^{-j\frac{2\pi l}{N}}\right), \quad \text{[Equation 5]}$$

-continued $$N = \frac{T}{T_s}$$

In Equation 5, y1 indicates the received signal in Equation 4 and L indicates the number of symbols used for calculating an average. In addition, N means an oversampling factor and is calculated as $T/T_s$.

4.2 Position Measurement Method Using Node of Heterogeneous Network

According to a position measurement method using OTDOA measurement, a position is estimated at a receiving end using a TOA difference between subframes transmitted from two cells. Thus, one of the two cells may be configured as a reference cell (i.e., a reference eNB or a reference node) corresponding to a measurement reference basis and the other cell may be configured as a measurement cell (i.e., a measurement eNB or a measurement node) corresponding to a measurement target. In this case, the measurement cell may be a heterogeneous network or a homogeneous network located adjacent to the reference cell. The receiving end may report a difference between TOA of a subframe received from the reference cell and TOA of a subframe received from the measurement cell to the reference cell corresponding to one of transmitting ends.

According to an embodiment of the present invention, it is preferred that the receiving end reports a plurality of measurement results to improve accuracy in the OTDOA measurement. To this end, if the receiving end uses Wi-Fi signals, which are very common in an indoor environment, the receiving end can obtain the same effect as that obtained from a plurality of measurement cells. In this case, a specific cell in the cellular network or a specific AP in the Wi-Fi network may be configured as the reference cell.

In this case, information on a relationship between transmission times of subframes or beacon frames corresponding to measurement targets of the reference and measurement cells may be defined in advance or transmitted by a node that actually performs the position estimation (e.g., reference cell or positioning server) to the receiving end. In other words, a timing relationship between the reference cell (e.g., cellular cell or Wi-Fi AP) and the Wi-Fi AP may be exchanged in advance.

As another aspect of the present invention, based on the assumption that a positioning server has information on the timing relationship between the reference cell (e.g., cellular cell or Wi-Fi AP) and the Wi-Fi AP, the positioning server may be configured to transmit the timing relationship information to the reference cell and the Wi-Fi AP.

4.2.1 OTDOA Measurement Method when Reference Cell is ENB of Cellular Network

Figure 11:
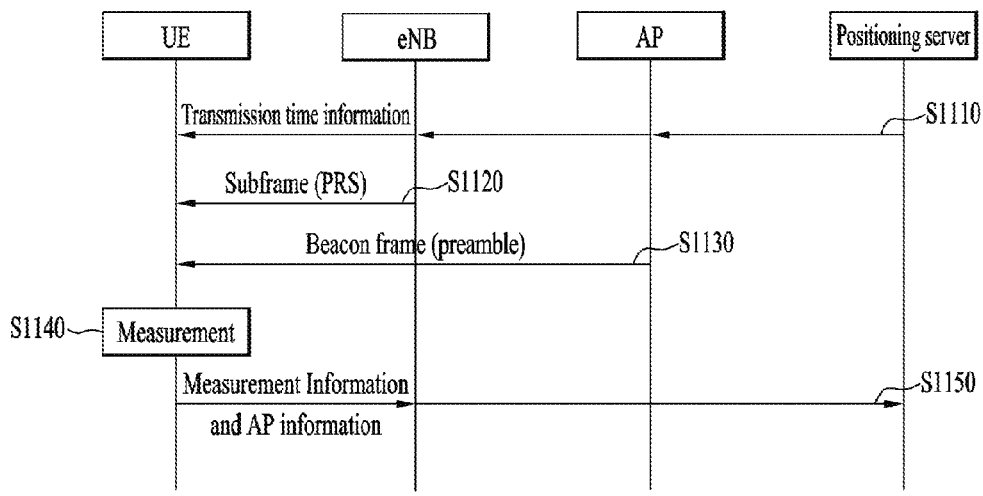
FIG. 11 is a view for explaining one method for measuring OTDOA when a reference cell is a base station in a cellular network.

FIG. 11 is a view for explaining one method for measuring OTDOA when a reference cell is an eNB in a cellular network.

In FIG. 11, a receiving end is a UE and a transmitting end may be an eNB in a cellular network or an AP in a Wi-Fi network. In addition, it is assumed that the eNB that manages a reference cell or a positioning server already knows transmission time information for a subframe or a beacon frame transmitted by the eNB or the AP for position estimation. In this case, it is also assumed that the eNB manages the reference cell and the AP manages a measurement cell.

After measuring a TOA difference between the beacon frame and the subframe from the cellular reference cell, the UE may report the difference to the cellular reference cell. In this case, transmission time information for the subframe from the cellular reference cell, which carries a signal for positioning, needs to be transmitted to the UE in advance. To satisfy requirements for accurate position measurement, it is preferred that the UE represents the TOA difference with sufficiently high degree of precision. Therefore, the UE may transmit, to the reference cell, AP information on the AP that transmits the beacon frame, which is used by the corresponding UE to measure the time difference. In this case, the AP information may include information on a Service Set Identifier (SSID) of the AP that transmits the beacon frame, which is measured by the UE, and information on an actual transmission time of the beacon (e.g., timestamp).

The reference cell may forward the UE's measurement report (e.g., information on the time difference between the subframe and the beacon frame, information on an identity of the Wi-Fi AP, or information on the actual transmission time of the beacon) to the positioning server.

The above-described procedures will be described again with reference to FIG. 11. Referring to FIG. 11, the UE receives the transmission time information indicating times at which the reference cell (i.e., eNB) and the measurement cell (i.e., AP) respectively transmit the subframe and the beacon frame to measure a position of the UE [S1110].

In the step S1110, the transmission time information may include an index value (or an offset value) of the subframe in which a PRS will be transmitted by the eNB for the position measurement and an index value (or an offset value) of the subframe in which a beacon will be transmitted by the AP for the position measurement. Alternatively, in this case, the transmission time information may include information on a relationship between the reference cell's subframe index and a timing at which the relevant beacon frame is transmitted rather than the subframe index value and the frame index value with respect to the individual cells.

In addition, the transmission time information may be directly transmitted from the positioning server to the UE. Alternatively, it may be transmitted through the eNB and/or AP. When the transmission time information is transmitted through the eNB and/or AP, the eNB or AP may transmit the PRS and/or beacon frame at a time indicated by the transmission time information. When the transmission time information is directly transmitted to the UE or when it is transmitted without intervention of the network, the transmission time information may be configured to indicate a predetermined time for measuring the UE's position.

The UE can receive the PRS for the position measurement in the subframe indicated by the transmission time information from the reference cell and a beacon preamble in the beacon frame [S1120 and S1130].

The UE may calculate a value of TOA1 from the reference cell based on the PRS and a value of TOA2 from the measurement cell based on the beacon preamble. Thereafter, the UE can generate measurement information indicating a difference between the TOA1 value and the TOA2 value [S1140].

The UE can transmit the measurement information measured in the step S1140 and the AP information on the AP transmitting the beacon frame, which the UE receives for the position measurement in the step S1130, to the reference cell or the positioning server [S1150].

When the UE transmits the measurement information and the AP information to the reference cell in the step S1150, the reference cell may directly measure the UE's position based on the measurement information and the AP information, which is reported by the UE. Alternatively, the reference cell may forward the measurement information and the AP information as position measurement information.

In FIG. 11, two or more APs may be located adjacent to the eNB corresponding to the reference cell. In this case, the UE may receive beacon preambles in beacon frames indicated by the transmission time information from the two or more APs. Thereafter, the UE may provide AP information on an AP, which transmits a beacon preamble used in OTDOA measurement, among the two or more APs to the reference cell or the positioning server.

When the reference cell is the cellular network (e.g., the LTE/LTE-A system), it has an advantage in that the positioning server and the existing root (i.e., interface) can be used as they are.

As another aspect of the present embodiment, it is assumed in FIG. 11 that the reference cell is a Wi-Fi AP and the measurement cell is a cellular eNB. That is, in the step S1120, the UE may calculate TOA1 with respect to a beacon preamble received in a beacon frame received from the Wi-Fi AP. In the step S1230, the UE may calculate TOA2 based on a PRS received from the LTE/LTE-A eNB. Thereafter, the UE may generate measurement information on a time difference between the TOA1 and the TOA2. The UE may transmit the measurement information to the AP corresponding to the reference cell and the AP may transmit the measurement information and its own AP information to the positioning server.

In the aforementioned embodiments of the present invention, it is assumed that the UE is connected to the reference cell and thus a wireless access service is provided to the UE by the reference cell.

4.2.2 OTDOA Measurement Method when Reference Cell is AP of Wi-Fi Network

In the following embodiment, a receiving end is a UE and a transmitting end may be an AP in a Wi-Fi network. That is, the UE is connected to a cellular network and all of the transmitting ends that transmit signals or frames for position measurement may be the AP in the Wi-Fi network.

In this case, the UE may generate measurement information by measuring a TOA difference between beacon frames transmitted from a reference cell (i.e., reference AP) and a measurement cell (i.e., measurement AP) and then report the measurement information to the reference cell. To satisfy requirements for accurate position measurement, it is preferred that the UE represents the TOA difference with sufficiently high degree of precision. Therefore, the UE may transmit, to the reference cell, AP information on the APs that transmit the beacon frames, which is used by the corresponding UE to measure the time difference. In this case, the AP information may include information on identifiers (i.e., SSIDs) of the APs that transmit the beacon frames and information on actual transmission times of the beacon frames (i.e., timestamp).

As another aspect of the present embodiment, the UE may transmit measurement information and AP information to a cellular eNB. That is, after obtaining transmission time information from the cellular eNB, the UE may receive beacon preambles in beacon frames indicated by the transmission time information from APs. Thereafter, the UE may calculate the measurement information based on the received beacon preambles and then transmit, to the cellular eNB, the AP information indicating the APs which transmit the beacon frames together with the measurement information. In this case, the cellular eNB may measure a position of the UE based on the measurement information and the AP information. Alternatively, the cellular eNB may forward the measurement information and the AP information to a positioning server to assist the positioning server to measure the UE's position.

The above-described procedures will be described again with reference to FIG. 12 and FIG. 13. Specifically, FIG. 12 is a view for explaining one method for measuring OTDOA when a reference cell is an AP in a Wi-Fi network.

Figure 12:
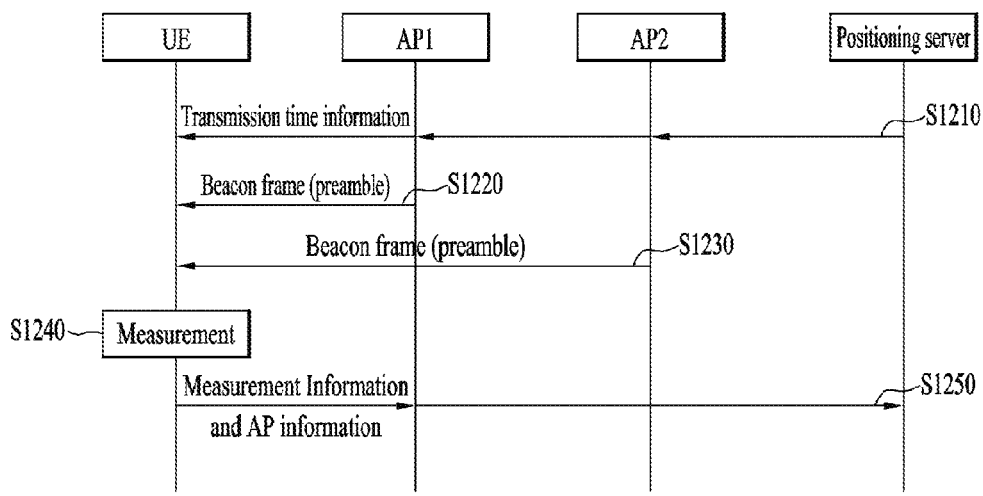
FIG. 12 is a view for explaining one method for measuring OTDOA when a reference cell is an AP in a Wi-Fi network.

Referring to FIG. 12, transmission time information indicating times at which a reference cell (i.e., AP1) and a measurement cell (i.e., AP2) transmit beacon frames to measure a position of a UE is transmitted to the UE [S1210].

In the step S1210, the transmission time information may include index values (or offset values) of the subframes in which beacons will be transmitted by the APs. Alternatively, in this case, the transmission time information may include information on a relationship between the reference cell's subframe index and a timing at which the relevant beacon frame is transmitted rather than the frame index values with respect to the individual cells.

In addition, the transmission time information may be transmitted from the positioning server to the UE. Alternatively, the positioning server may transmit the transmission time information to the UE through the AP1.

Moreover, the positioning server may directly transmit the transmission time information to the UE. Alternatively, the positioning server may transmit the transmission time information through the AP1 and/or the AP2. When the transmission time information is transmitted through the AP1 and/or AP2, the AP1 and/or AP2 may transmit the beacon frames at the times indicated by the transmission time information. When the transmission time information is directly transmitted to the UE or when it is transmitted without intervention of the network, the transmission time information may be configured to indicate a predetermined time for measuring the UE's position.

The UE can receive the beacon preambles for the position measurement in the beacon frames indicated by the transmission time information from the reference cell (AP1) and the measurement cell (AP2) [S1220 and S1230].

The UE may calculate a value of TOA1 based on the beacon preamble transmitted from the reference cell and a value of TOA2 based on the beacon preamble transmitted from the measurement cell. Thereafter, the UE can generate measurement information indicating a difference between the TOA1 value and the TOA2 value [S1240].

The UE can transmit the measurement information measured in the step S1240 and the AP information on the APs transmitting the beacon frames, which the UE receives for the position measurement in the step S1230, to the reference cell or the positioning server [S1250].

When the UE transmits the measurement information and the AP information to the reference cell in the step S1250, the reference cell may directly measure the UE's position based on the measurement information and the AP information, which is reported by the UE. Alternatively, the reference cell may forward the measurement information and the AP information as position measurement information.

In FIG. 12, two or more neighbor APs may be located adjacent to the AP1 corresponding to the reference cell. In this case, the UE may receive beacon preambles in beacon frames indicated by the transmission time information from the two or more APs. Thereafter, the UE may provide AP information on an AP, which transmits a beacon preamble used in OTDOA measurement, among the two or more APs to the reference cell or the positioning server.

Figure 13:
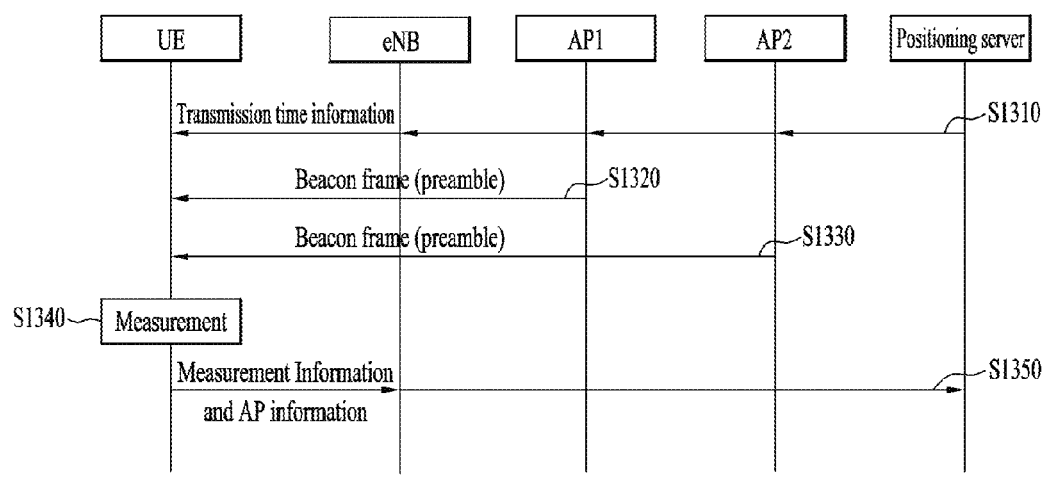
FIG. 13 is a view for explaining another method for measuring OTDOA when a reference cell is an AP in a Wi-Fi network.

FIG. 13 is a view for explaining another method for measuring OTDOA when a reference cell is an AP in a Wi-Fi network.

The basic assumption used in FIG. 13 is the same as in FIG. 12 but an entity for receiving transmission time information, measurement information, and AP information is assumed to be an eNB in a cellular network. That is, since the cellular eNB performs association between an AP and the cellular network, it is not necessary to define a new interface between the AP and a positioning server.

Referring to FIG. 13, transmission time information indicating times at which a reference cell (i.e., AP1) and a measurement cell (i.e., AP2) transmit beacon frames to measure a UE's position is transmitted to the UE [S1310].

In the step S1310, the positioning server may directly transmit the transmission time information to the UE. Alternatively, the positioning server may transmit the transmission time information through the eNB and/or the AP1/2. When the transmission time information is transmitted through the eNB and/or AP1/2, the eNB and/or AP1/2 may transmit a PRS and/or the beacon frames at the times indicated by the transmission time information. When the transmission time information is directly transmitted to the UE or when it is transmitted without intervention of the network, the transmission time information may be configured to indicate a predetermined time for measuring the UE's position.

The UE can receive beacon preambles for the position measurement in the beacon frames indicated by the transmission time information from the reference cell (AP1) and the measurement cell (AP2) [S1320 and S1330].

The UE may calculate a value of TOA1 based on the beacon preamble transmitted from the reference cell and a value of TOA2 based on the beacon preamble transmitted from the measurement cell. Thereafter, the UE can generate measurement information indicating a difference between the TOA1 value and the TOA2 value [S1340].

The UE can transmit the measurement information measured in the step S1340 and the AP information on the APs transmitting the beacon frames, which the UE receives for the position measurement in the step S1330, to the cellular eNB or the positioning server [S1350].

When the UE transmits the measurement information and the AP information to the cellular eNB in the step S1350, the cellular eNB may directly measure the UE's position based on the measurement information and the AP information, which is reported by the UE. Alternatively, the cellular eNB may forward the measurement information and the AP information for measurement of the UE's position.

As other aspects of the embodiments of the present invention described in FIGS. 11 to 13, the positioning server may transmit, to a UE, assistance data necessary for position measurement through a cellular eNB using a Wi-Fi signal. In this case, the assistance data may include information on an AP that transmits a beacon frame corresponding to a Wi-Fi signal (e.g., position information of a Wi-Fi AP, and an SSID) and transmission time information (e.g., beacon frame transmission time configuration information of a reference cell (i.e., Wi-Fi AP) and/or a subframe transmission time of a reference cellular cell (or beacon transmission time configuration information of a reference AP)). In case of an indoor AP, position information of the Wi-Fi AP may include not only information on coordinates in the horizontal plane but also information on coordinates in the vertical plane. For instance, in the case of a skyscraper, information on a floor or a height where the corresponding AP is installed may be included.

In this case, if it is determined during carrier sensing that a corresponding carrier (i.e., medium) is busy, beacon transmission may be delayed and thus there may be a difference between a time configured for transmission of a beacon and a time at which a beacon is actually transmitted. In addition, geographical position information of the Wi-Fi AP can also be included to measure the UE's position more accurately.

In the aforementioned embodiments, the cellular reference cell may transmit position information of the Wi-Fi AP to the positioning server. In this case, it can be assumed that the cellular reference cell and the Wi-Fi AP are installed by the same service vendor or operator. The assumption may be interpreted as transmission of position information of the reference cell/measurement cell, which transmits a measurement signal, in the OTDOA and it may have an effect of increasing the number of cells used in the position measurement.

Alternatively, the Wi-Fi AP may directly transmit its position information to the positioning server without intervention of the cellular reference cell. However, considering that measurement may be limited due to restrictions such as access privileges for the Wi-Fi AP, a case in which the cellular reference cell transmits Wi-Fi timing measurement information is more efficient than the case where the Wi-Fi AP directly transmits the information to the positioning server.

As another method, when the UE receives the geographical position information of the Wi-Fi AP from the positioning server, the UE may also report the geographical position information of the corresponding Wi-Fi AP together with the measurement information to the reference cell by including the geographical position information in the AP information.

4.3 RF Pattern Matching Method

The RF pattern matching method means a method of estimating a position based on measurement information measured by a receiving end. In other words, according to the RF pattern matching method, when a receiving end located at a specific position receives a specific signal, the receiving end creates a database on information such as signal strength, delay, etc. and compares the database with measurement information to estimate a position.

When a position is estimated using the RF pattern matching method, a Wi-Fi signal can be used. That is, the receiving end may measure an RSSI for a beacon signal transmitted from a Wi-Fi AP and then report the measured RSSI. Alternatively, the receiving end may measure a difference between a beacon signal transmission time and a beacon signal reception time and then report the measured difference to the positioning server for the position estimation. In this case, to satisfy requirements for accurate position measurement, it is preferred that the receiving end (i.e. UE) represents a reception time difference with sufficiently high degree of precision.

Therefore, when the position estimation is performed using the RF pattern matching method, measurement information which can contain the RSSI for the beacon signal and TX-RX time difference for the beacon signal may be reported together with geographical position information of the Wi-Fi AP. In this case, a cellular cell or the Wi-Fi AP may transmit, to the positioning server, the measurement information containing the RSSI for the beacon signal and the TX-RX time difference of the beacon signal, and AP information containing the geographical information of the Wi-Fi AP.

In the embodiments of the present invention described with reference to FIGS. 11 to 13, a subframe or beacon frame transmitted by the reference cell can be referred to as a first signal and a beacon frame transmitted by the measurement cell can be referred to as a second signal. In addition, a beacon preamble included in the beacon frame can be referred to as a PLCP preamble.

5. Apparatuses

Figure 14:
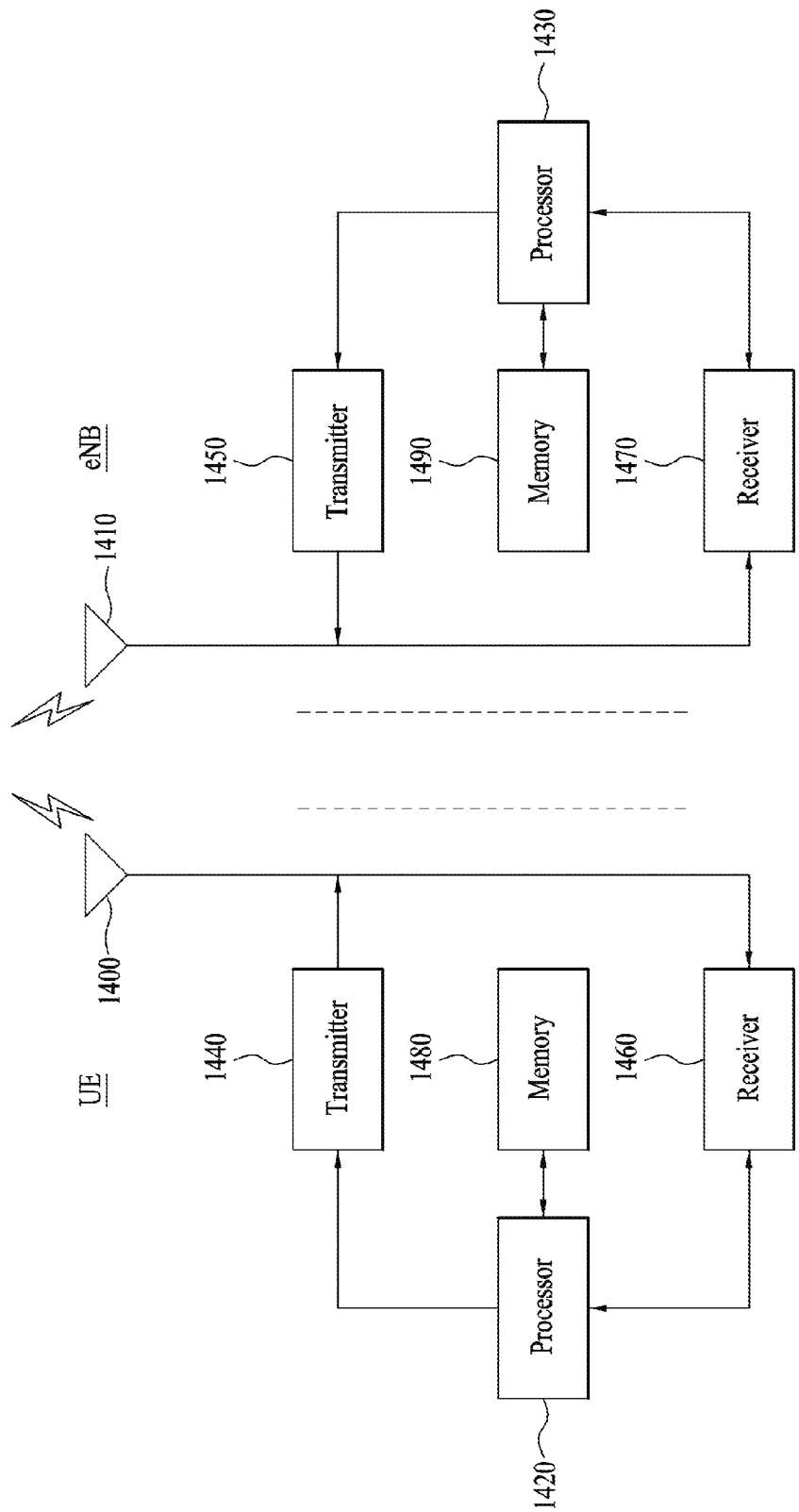
FIG. 14 illustrates apparatuses for implementing the methods described in FIGS. 1 to 13.

Apparatuses illustrated in FIG. 14 are means that can implement the methods described before with reference to FIGS. 1 to 13.

A UE may act as a transmission end on a UL and as a reception end on a DL. An eNB may act as a reception end on a UL and as a transmission end on a DL.

That is, each of the UE and the eNB may include a Transmitter (Tx) 1440 or 1450 and a Receiver (Rx) 1460 or 1470, for controlling transmission and reception of information, data, and/or messages, and an antenna 1400 or 1410 for transmitting and receiving information, data, and/or messages.

Each of the UE and the eNB may further include a processor 1420 or 1430 for implementing the afore-described embodiments of the present disclosure and a memory 1480 or 1490 for temporarily or permanently storing operations of the processor 1420 or 1430.

The embodiments of the present invention can be implemented based on the above-described components and functions of the UE and the eNB. For example, the processor of the eNB may transmit transmission time information to the UE and transmit a subframe at a time indicated by the transmission time information. Thereafter, the processor of the eNB may measure a position of the UE based on measurement information and AP information received from the UE or forward corresponding information to a positioning server. The eNB in FIG. 14 may correspond to an AP. In this case, the AP may transmit, to the UE, a beacon frame at a time indicated by the transmission time information received from the positioning server. When the corresponding AP is a reference AP, a processor of the reference AP may directly measure the UE's position by receiving the measurement information and the AP information from the UE. Alternatively, the processor of the reference AP may forward the measurement information and the AP information to the positioning server or a cellular eNB, whereby the positioning server or the cellular eNB may measure the UE's position. The processor of the UE may control the transmitter and the receiver to receive the subframe or at least one beacon frame at the times indicated by the transmission time information from a reference cell and a measurement cell and transmit the measurement information, which contains a TOA difference value between the corresponding received signals, and the AP information to the reference cell, the cellular eNB, and/or the positioning server.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1480 or 1490 and executed by the processor 1420 or 1430. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for measuring a position of a User Equipment (UE) using a heterogeneous network signal in a Long Term Evolution (LTE) system, the method performed by the UE and comprising:

receiving transmission time information from a positioning server indicating times at which signals for measuring the position of the UE are transmitted;

receiving a first signal from a reference cell at a first time indicated by the transmission time information;

receiving a second signal from a measurement cell at a second time indicated by the transmission time information, wherein at least the reference cell or the measurement cell is an Access Point (AP) that supports a heterogeneous network that is not a network for the LTE system;

generating measurement information by calculating a difference between the first time and the second time; and transmitting the generated measurement information and AP information of the AP to an evolved Node B (eNB), wherein a signal used in the heterogeneous network is a beacon preamble included in a beacon frame, and wherein a signal used in the LTE system is a Positioning Reference Signal (PRS) transmitted from a cellular eNB.

2. The method of claim 1, wherein the transmission time information is included in assistance data that contains the AP information.

3. The method of claim 1, wherein:

the first signal is a heterogeneous network signal transmitted from a first AP corresponding to the reference cell; and the second signal is a heterogeneous network signal transmitted from a second AP corresponding to the measurement cell.

4. The method of claim 3, wherein each of the first and second signals is the beacon preamble.

5. The method of claim 1, wherein the AP information includes an identifier indicating the AP and geographical position information of the AP.

6. The method of claim 1, further comprising transmitting the generated measurement information and the AP information to the positioning server.

7. A user equipment (UE) generating measurement information using a heterogeneous network signal in a Long Term Evolution (LTE) system, the UE comprising:

a receiver configured to receive signals;

a transmitter configured to transmit signals; and a processor operatively coupled to the receiver and the transmitter and configured to generate the measurement information by:

controlling the receiver to receive transmission time information from a positioning server indicating times at which signals for measuring the position of the UE are transmitted;

controlling the receiver to receive a first signal from a reference cell at a time indicated by the transmission time information;

controlling the receiver to receive a second signal from a measurement cell at a second time indicated by the transmission time information;

wherein at least the reference cell or the measurement cell is an Access Point (AP) that supports a heterogeneous network that is not a network for the LTE system, generating the measurement information by calculating a difference between the first time and the second time; and controlling the transmitter to transmit the generated measurement information and AP information of the AP to an evolved Node B (eNB), wherein a signal used in the heterogeneous network is a beacon preamble included in a beacon frame, and wherein a signal used in the LTE system is a Positioning Reference Signal (PRS) transmitted from a cellular eNB.

8. The UE of claim 7, wherein the transmission time information is included in assistance data that contains the AP information.

9. The UE of claim 7, wherein:

the first signal is a heterogeneous network signal transmitted from a first AP corresponding to the reference cell; and the second signal is a heterogeneous network signal transmitted from a second AP corresponding to the measurement cell.

10. The UE of claim 9, wherein each of the first and second signals is the beacon preamble.

11. The UE of claim 7, wherein the AP information includes an identifier indicating the AP and geographical position information of the AP.

12. The UE of claim 7, wherein the processor further controls the transmitter to transmit the generated measurement information and the AP information to the positioning server.

* * * * *